(12) United States Patent
Thiesson et al.

(10) Patent No.: US 7,580,813 B2
(45) Date of Patent: Aug. 25, 2009

(54) SYSTEMS AND METHODS FOR NEW TIME SERIES MODEL PROBABILISTIC ARMA

(75) Inventors: Bo Thiesson, Woodinville, WA (US); Christopher A. Meek, Kirkland, WA (US); David M. Chickering, Bellevue, WA (US); David E. Heckerman, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1234 days.

(21) Appl. No.: 10/463,145

(22) Filed: Jun. 17, 2003

(65) Prior Publication Data

US 2004/0260664 A1 Dec. 23, 2004

(51) Int. Cl.
*G06F 17/50* (2006.01)
*G05B 23/02* (2006.01)

(52) U.S. Cl. .............................. 703/2; 700/31; 700/83; 706/58

(58) Field of Classification Search ..................... 703/2, 703/22; 700/31, 83, 51; 706/58, 20, 26
See application file for complete search history.

(56) References Cited

U.S. PATENT DOCUMENTS

| | | | | |
|---|---|---|---|---|
| 5,544,281 | A * | 8/1996 | Maruoka et al. | 706/58 |
| 5,809,499 | A * | 9/1998 | Wong et al. | 707/6 |
| 5,835,682 | A | 11/1998 | Broomhead et al. | |
| 5,949,678 | A * | 9/1999 | Wold et al. | 700/83 |
| 6,125,105 | A | 9/2000 | Edwads et al. | |
| 6,336,108 | B1 * | 1/2002 | Thiesson et al. | 706/20 |
| 6,363,333 | B1 | 3/2002 | Deco et al. | |
| 6,532,454 | B1 | 3/2003 | Werbos | |
| 6,560,586 | B1 * | 5/2003 | Liang et al. | 706/25 |
| 6,574,587 | B2 | 6/2003 | Waclawski | |
| 6,735,580 | B1 | 5/2004 | Li et al. | |
| 6,778,929 | B2 | 8/2004 | Egi | |
| 6,853,920 | B2 * | 2/2005 | Hsiung et al. | 702/1 |
| 6,882,992 | B1 | 4/2005 | Werbos | |
| 6,928,398 | B1 | 8/2005 | Fang et al. | |
| 6,987,865 | B1 | 1/2006 | Szeliski et al. | |
| 7,092,457 | B1 | 8/2006 | Chugg et al. | |
| 7,139,703 | B2 | 11/2006 | Acero et al. | |

(Continued)

OTHER PUBLICATIONS

Kai Ming Ting and Boon Toh Low, "Theory Combination: an alternative to Data Combination", 1996, 22 pages.

(Continued)

*Primary Examiner*—Thai Phan
(74) *Attorney, Agent, or Firm*—Lee & Hayes, PLLC

(57) ABSTRACT

The present invention utilizes a cross-prediction scheme to predict values of discrete and continuous time observation data, wherein conditional variance of each continuous time tube variable is fixed to a small positive value. By allowing cross-predictions in an ARMA based model, values of continuous and discrete observations in a time series are accurately predicted. The present invention accomplishes this by extending an ARMA model such that a first time series "tube" is utilized to facilitate or "cross-predict" values in a second time series tube to form an "ARMAxp" model. In general, in the ARMAxp model, the distribution of each continuous variable is a decision graph having splits only on discrete variables and having linear regressions with continuous regressors at all leaves, and the distribution of each discrete variable is a decision graph having splits only on discrete variables and having additional distributions at all leaves.

30 Claims, 15 Drawing Sheets

U.S. PATENT DOCUMENTS

| | | | |
|---|---|---|---|
| 2002/0072882 A1* | 6/2002 | Kruger et al. | 703/2 |
| 2003/0039867 A1 | 2/2003 | Meek et al. | |
| 2003/0046038 A1 | 3/2003 | Deligne et al. | |
| 2003/0065409 A1* | 4/2003 | Raeth et al. | 700/31 |
| 2004/0068199 A1* | 4/2004 | Echauz et al. | 600/544 |
| 2004/0068332 A1* | 4/2004 | Ben-Gal et al. | 700/51 |
| 2004/0101048 A1* | 5/2004 | Paris | 375/240.12 |
| 2004/0260664 A1 | 12/2004 | Thiesson et al. | |
| 2005/0015217 A1 | 1/2005 | Weidl et al. | |
| 2005/0096873 A1* | 5/2005 | Klein | 702/184 |
| 2006/0074558 A1 | 4/2006 | Williamson et al. | |
| 2006/0129395 A1 | 6/2006 | Thiesson et al. | |
| 2006/0247900 A1 | 11/2006 | Brocklebank | |
| 2007/0150077 A1 | 6/2007 | Bocharov et al. | |
| 2008/0010043 A1 | 1/2008 | Thiesson et al. | |

OTHER PUBLICATIONS

Sam-Joo Doh and Richard M. Stern, "Inter-Class MLLR for Speaker Adaptation", Department of Electrical and Computer Engineering and School of Computer Science, Carnegie Mellon University, 2000, 4 pages.

Oliver Siohan, Tor Andre Myrvoll and Chin-Hui Lee, "Structural Maximum a Posteriori Linear Regression for Fast HMM Adaptation", Multimedia Communications Research Lab Bell Laboratories—Lucent Technologies, 2000, 8 pages.

Andrew W. Moore, Jeff Schneider and Kan Deng, "Efficient Locally Weighted Polynomial Regression Predictions" 1997, 9 pages.

Aram Karalic, "A Employing Linear Regression in Regression Tree Leaves", European Conference on Artificial Intelligence, 1992, 2 pages.

Hugh Chipman, Edward I. George and Robert E. McCulloch, "A Bayesian Treed Models", Feb. 2001, 29 pages.

George Kapetanios, "A Threshold Models for Trended Time Series", 1999, 32 pages.

Felix A. Gers, Douglas Eck and Jurgen Schmidhuber, "Applying LSTM to Time Series Predictable Through Time-Window Approaches", 2001, 21 pages.

David Maxwell Chickering, David Heckering, and Christopher Meek, "A Bayesian Approach to Learning Bayesian Networks with Local Structure", Aug. 1997, 19 pages.

Neil A. Gershenfeld and Andreas S. Weigend, "The Future of Time Series", 1993, pp. i-iii, 1-70, 569-582.

Ansley, Craig F., An algorithm for the exact likelihood of a mixed autoregressive-moving average process, 1979, pp. 59-65, Biometrika, printed in Great Britain.

Kenneth O. Cogger, Modern Regression Methods: A Comparative Discussion, peakconsulting.com/coggerde.pdf, 2001, 12 pages, Peak Consulting.

U.S. Appl. No. 11/005,148, filed Dec. 6, 2004, Thiesson et al.
U.S. Appl. No. 11/011,864, filed Dec. 24, 2004, Thiesson et al.
Seeger, Bayesian Gaussian Process Models: PAC-Bayesian Generalization Error Bounds and Sparse Approximation, Jul. 2003.
OA dated Aug. 21, 2008 for U.S. Appl. No. 11/319,894, 22 pages.
OA dated Mar. 5, 2009 for U.S. Appl. No. 11/319,894, 18 pages.
OA dated Jul. 8, 2008 for U.S. Appl. No. 11/005,148, 16 pages.
OA dated Dec. 11, 2008 for U.S. Appl. No. 11/005,148, 10 pages.
OA dated Jun. 9, 2008 for U.S. Appl. No. 10/102,116, 38 pages.
OA dated Feb. 9, 2009 for U.S. Appl. No. 10/102,116, 34 pages.
Bach, F.G., et al., Learning Graphical Models For Stationary Time Series, (2004), IEEE Transactions On Signal Processing, to appear.

Berzuini, et al. "A Unified Approach for Modeling Longitudinal and Failure Time Data, with Application in Medical Monitoring." IEEE Trans. On Pattern Analysis and Machine Intelligence. Feb. 1996, vol. 18, issue 2, pp. 109-123.

Bo Thiesson, et al. ARMA Time Series Modeling with Graphical Models. Proceedings of the Twentieth Conference on Uncertainty in Artificial Intelligence, 2004, pp. 552-560. AUAI Press.

Bo Thiesson, et al. Efficient Gradient Computaion for Conditional Gaussian Models. Proceedings of 10th Int'l Workshop on Artificial Intelligence and Statistics. The Society for Artificial Intelligence and Statistics, Jan. 2005.

Bo Thiesson. Score and Information for Recursive Exponential Modelswith incomplete Data. Proceedings of the Thirteenth Conference on uncertainity in AI, 1997, pp. 453-463. Morgan Kaufmann Publishers.

Box, et al. Time Series Analysis : Forecasting and Control (3rd Edition) 1994, Prentice Hall, New Jersey.

Chipman, et al. A Bayesian Treed Models, Feb. 2001. pp. 1-29.

Coggers. Modern Regression Methods: A Comparative Discussion@, Apr. 19, 2001, pp. 1-11.

Cooper, G., et al., A Model For Temporal Probabilistic Reasoning (Technical Report KSL-88-30), (1988), Stanford University, Section On Medical Informatics, Stanford, California.

Dempster, et al. Maximum Likelyhood for Incomplete Data Via the EM Algorithm, 1997, Journal of the Royal Statistical Soceity, B39, pp. 1-38.

Gers. Applying LSTM to Time Series Predictable Through Time Window Approaches, 2001, pp. 1-8.

Ghahramani, Z., Learning Dynamic Bayesian Networks. In Adaptive Processing Of Sequences And Data Structures. Lecture Notes in Artificial Intelligence, (1998), p. 168-197. Springer-Verlag, Berlin.

Golub, et al. Matrix Computations, 1996, The John Hopkins University Press, London.

John Binder, et al. Adaptive Probabilistic Networks with Hidden Variables, Machine Learning, 1997, pp. 213-244.

Jones. Maximum Likelyhood Fitting of ARMA Models to Time Series with Missing Observations. 1980, Technometrics, pp. 389-395.

Kapetanios. A Threshold Model for Trended Time Series, 1999, pp. 1-32.

Lauritzen, S.L., et al., Stable Local Computation With Conditional Gaussian Distributions, Statistics and Computing, (2001), pp. 11, 191-203.

Matthias Seeger. Bayesian Gaussian Process Models: PAC-Bayesian Generalization Error Bounds and Sparse Approximation, Jul. 2003.

Meek, et al., Autoregressive Tree Models For Time-Series Analysis, Proceedings Of The Second Internationsl SIAM Conference On Data Mining, (2002), pp. 229-244, Arlington, VA: SIAM.

Meek, et al. Autoregressive Tree Models for Time Series Analysis. Jan. 10, 2002. http://research.microsoft.com/~meek/papers/dmart.ps &pub=63.

Meek. "Annotated Bibliography of Papers by Christopher Meek." Mar. 2005, printed Dec. 28, 2006. http://research.microsoft.com/~meek/mypapers.htm.

Penzer, J., et al., The Exact Likelihood Of An Autoregressive-Moving Average Model With Incomplete Data, (1997), Biometrika, p. 84, 919-928.

Reinsel, G. C., Elements Of Multivariate Time Series Analysis, (2003), Springer-Verlag, New York.

Thomas Dean and Keiji Kanazawa, Probabilistic Temporal Reasoning, Technical Report, May 1988, Brown University, pp. 524-528.

* cited by examiner

SYSTEMS AND METHODS FOR NEW TIME SERIES MODEL PROBABILISTIC ARMA

REFERENCE TO RELATED APPLICATION

This application is related to U.S. patent application Ser. No. 10/102,116, which was filed by Meek, et al on Mar. 19, 2002, entitled BAYESIAN APPROACH FOR LEARNING REGRESSION DECISION GRAPH MODELS AND REGRESSION MODELS FOR TIME SERIES ANALYSIS and is herein incorporated by reference (hereinafter known as "Meek, et al.").

TECHNICAL FIELD

The present invention relates generally to data analysis, and more particularly to systems and methods for providing a new time series model probabilistic ARMA utilizing cross-predictions.

BACKGROUND OF THE INVENTION

The use of data analysis tools has increased dramatically as society has become more dependent on digital information storage. In e-commerce and other Internet and non-Internet applications, databases are generated and maintained that have astronomically large amounts of information. Such information is typically analyzed, or "mined," to learn additional information regarding customers, users, products, etc. This information allows businesses and other users to better implement their products and/or ideas.

Data mining is typically the extraction of information from data to gain a new, insightful perspective. Data mining can employ machine learning, statistical and/or visualization techniques to discover and present knowledge in a form that is easily comprehensible to humans. Generally speaking, humans recognize or translate graphical items more easily than textual ones. Thus, larger amounts of information can be relayed utilizing this means than by other methods. As such, graphical statistical models have proven invaluable in data mining.

A Bayesian network is one type of a graphical statistical model that encodes probabilistic relationships among variables of interest. Over the last decade, the Bayesian network has become a popular representation for encoding uncertain expert knowledge in expert systems. When used in conjunction with statistical techniques, the graphical model has several advantages for data analysis. Because the model encodes dependencies among all variables, it readily handles situations where some data entries are missing. A graphical model, such as a Bayesian network, can be used to learn causal relationships, and hence can be used to gain understanding about a problem domain and to predict the consequences of intervention. Because the model has both a causal and probabilistic semantics, it is an ideal representation for combining prior knowledge (which often comes in causal form) and data. Additionally, Bayesian statistical methods in conjunction with Bayesian networks offer an efficient and principled approach for avoiding the over fitting of data.

Bayesian network statistical model variations include decision trees and decision graphs. A decision tree data structure corresponds generally to an acyclic, undirected graph where nodes are connected to other respective nodes via a single path. The graph is acyclic in that there is no path that both emanates from a vertex and returns to the same vertex, where each edge in the path is traversed only once. A probabilistic decision tree is a decision tree that is used to represent a conditional probability distribution for a target variable given some set of predictor variables. As compared to a table, which is another way to represent a conditional probability distribution when all variables are discrete, a tree is generally a more efficient way of storing probabilities because of its ability to represent equality constraints within a conditional probability distribution.

A decision graph is a further generalization of a decision tree. Similar to a decision tree, a decision graph can represent equality constraints in a conditional probability distribution. In contrast to a decision tree, however, non-root nodes in a decision graph can have more than one parent. This characteristic enables a richer set of relationships to be represented by a decision graph than by a decision tree. For example, relationships between a non-root node and multiple parent nodes can be represented in a decision graph by corresponding edges interconnecting the non-root node with its parent nodes.

Graphical models facilitate probability theory through the utilization of graph theory. This allows for a method of dealing with uncertainty while reducing complexity. The modularity of a graphical model permits representation of complex systems by utilizing less complex elements. The connections and relationships of individual elements are identified by the probability theory, while the elements themselves are constructed by the graph theory. Utilizing graphics also provides a much more intuitive human interface to difficult problems.

Nodes of a probabilistic graphical model represent random variables. Their connectivity can indicate associative qualities such as dependence and independence and the like. If no connectivity (i.e., "arcs") is present, this represents conditional independence assumptions, providing a representation of joint probability distributions. Graphical models can be "directed" or "undirected" depending on how they are constructed. Undirected graphical models have a more simplistic definition of independence, while directed graphical models are more complex by nature. Bayesian or "Belief" networks (BN) are included in the directed category and are utilized extensively in statistics and artificial intelligence to show causality between elements or "nodes." They are also highly beneficial in supplying "inferences." That is, they are able to infer information based on a posterior probability (i.e., "likelihood") utilizing Bayes' rule. Thus, for a given outcome, its cause can be probabilistically deduced utilizing a directed graphical model.

A directed acyclic graph (DAG) such as a Bayesian network can also be applied to provide predictions relating to a time series. One such technique is to utilize an autoregressive (AR) method combined with a moving average (MA) method. This is known as "ARMA" or autoregressive, moving average. These types of models are models of persistence in a time series. By understanding the persistence of a time series, predictions can be made regarding future values of that time series. This proves invaluable in economics, business, and industrial arenas. Predicting behavior allows one to adjust parameters if the desired outcome is not the predicted outcome. Thus, for example, a company can predict its stock value based on current financial states and determine if they need to improve on cash reserves, sales, and/or capital investments in order to achieve a desired stock price. This also permits a study of the "influence" of various parameters on future values.

SUMMARY OF THE INVENTION

The following presents a simplified summary of the invention in order to provide a basic understanding of some aspects of the invention. This summary is not an extensive overview of the invention. It is not intended to identify key/critical elements of the invention nor to delineate the scope of the invention. Its sole purpose is to present some concepts of the invention in a simplified form as a prelude to the more detailed description that is presented later.

The present invention relates generally to data analysis, and more particularly to systems and methods for providing a new time series model probabilistic ARMA utilizing cross-predictions, called "ARMAxp".

In ARMAxp models, ARMA models are leveraged via a cross-prediction scheme where predictions for a primary time series "tube" are obtained not only from observations in the past, but also from observations on secondary, cross-predicting time tubes. ARMA models are further leveraged by allowing discrete as well as continuous observed values for primary and secondary time tubes, and by utilizing a distribution with a small variance rather than a deterministic linear relation for describing the relationship between a variable in a primary time tube and (regressor) variables used to predict this variable. In general, in the ARMAxp model, the distribution of each continuous variable is a decision graph having splits only on discrete variables and having linear regressions with continuous regressors at all leaves, and the distribution of each discrete variable is a decision graph having splits only on discrete variables and having additional distributions at all leaves. An expectation maximization (EM) algorithm is utilized to derive maximum a posterior (MAP) or maximum likelihood (ML) estimates to approximate parameters of an ARMAxp model given data. An asymptotic approximation to the marginal likelihood of a model structure is then utilized to select the structure of an ARMAxp model. A directed acyclic graph (DAG) model inference algorithm is utilized to predict future observations given the ARMAxp model and its parameters. Thus, values of continuous and discrete observations in a time series are accurately predicted utilizing an extension of a familiar data analysis model, providing an easy to learn and accurate prediction model.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

DETAILED DESCRIPTION OF THE INVENTION

Figure 1:
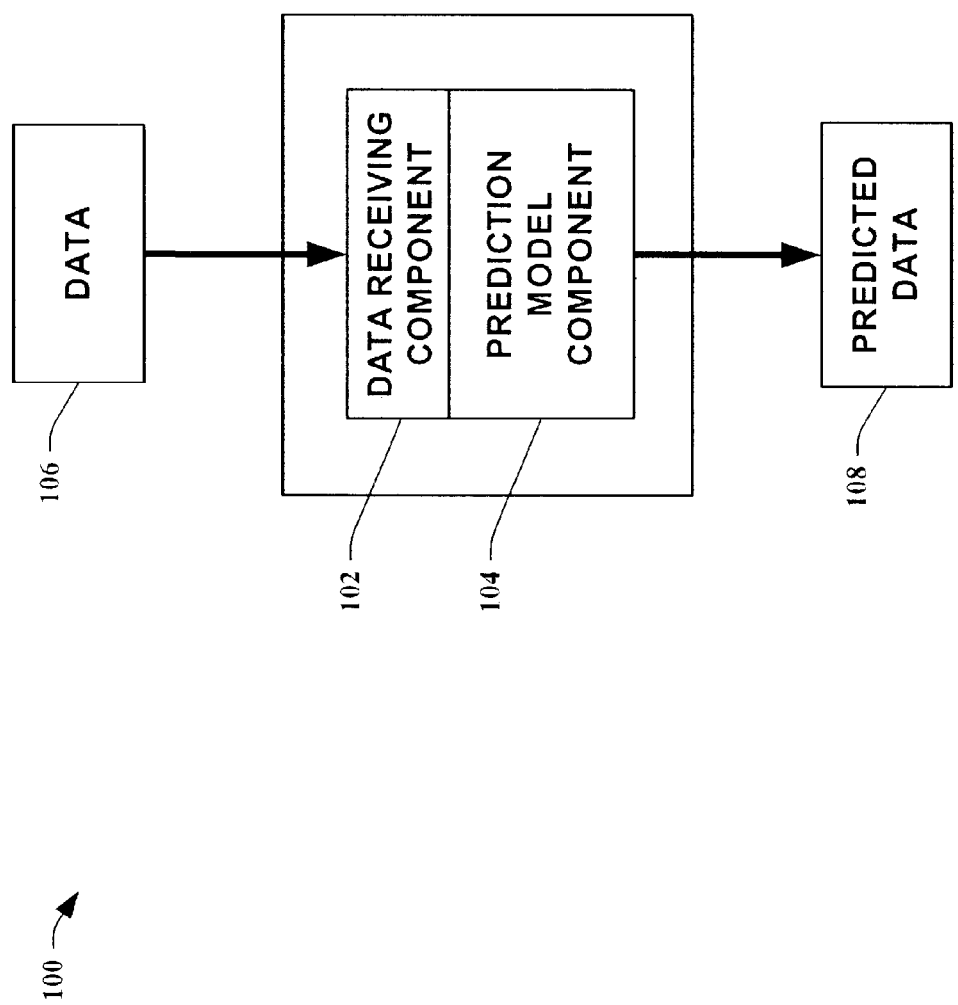
FIG. 1 is a block diagram of a time series prediction system in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "component" is intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a computer component. One or more components may reside within a process and/or thread of execution and a component may be localized on one computer and/or distributed between two or more computers. A "thread" is the entity within a process that the operating system kernel schedules for execution. As is well known in the art, each thread has an associated "context" which is the volatile data associated with the execution of the thread. A thread's context includes the contents of system registers and the virtual address belonging to the thread's process. Thus, the actual data comprising a thread's context varies as it executes.

The present invention is a system and method for discrete/finite and continuous time-series prediction. It incorporates a method for learning auto-regressive models for discrete time series as disclosed in the related application, Meek, et al. and extends the well-known ARMA (auto-regressive, moving average) method for time series. The present invention allows for accurate prediction of values of continuous and possibly discrete/finite observations in a time series. For example, the present invention can allow a merchant to predict today's sales of umbrellas given past sales of umbrellas, past sales of rain hats, and today's weather. The present invention also provides a model that has some degree of familiarity in data analysis circles. This permits a faster learning curve for implementing the present invention. A special case of the present invention is an ARMA-like model.

In FIG. 1, a block diagram of a time series prediction system 100 in accordance with an aspect of the present invention is shown. The system 100 is comprised of a data receiving component 102 and a prediction model component 104. Data 106, such as continuous and/or discrete time series observation data, is received into the system 100 by the data receiving component 102. The prediction model component 104 assesses the data and predicts values for an entity from which the data 106 is obtained, outputting predicted data 108. The prediction model component 104, in this instance of the present invention, utilizes processing techniques to expand an ARMA-like model and incorporates cross-predictions to determine the predicted data 106.

Figure 2:
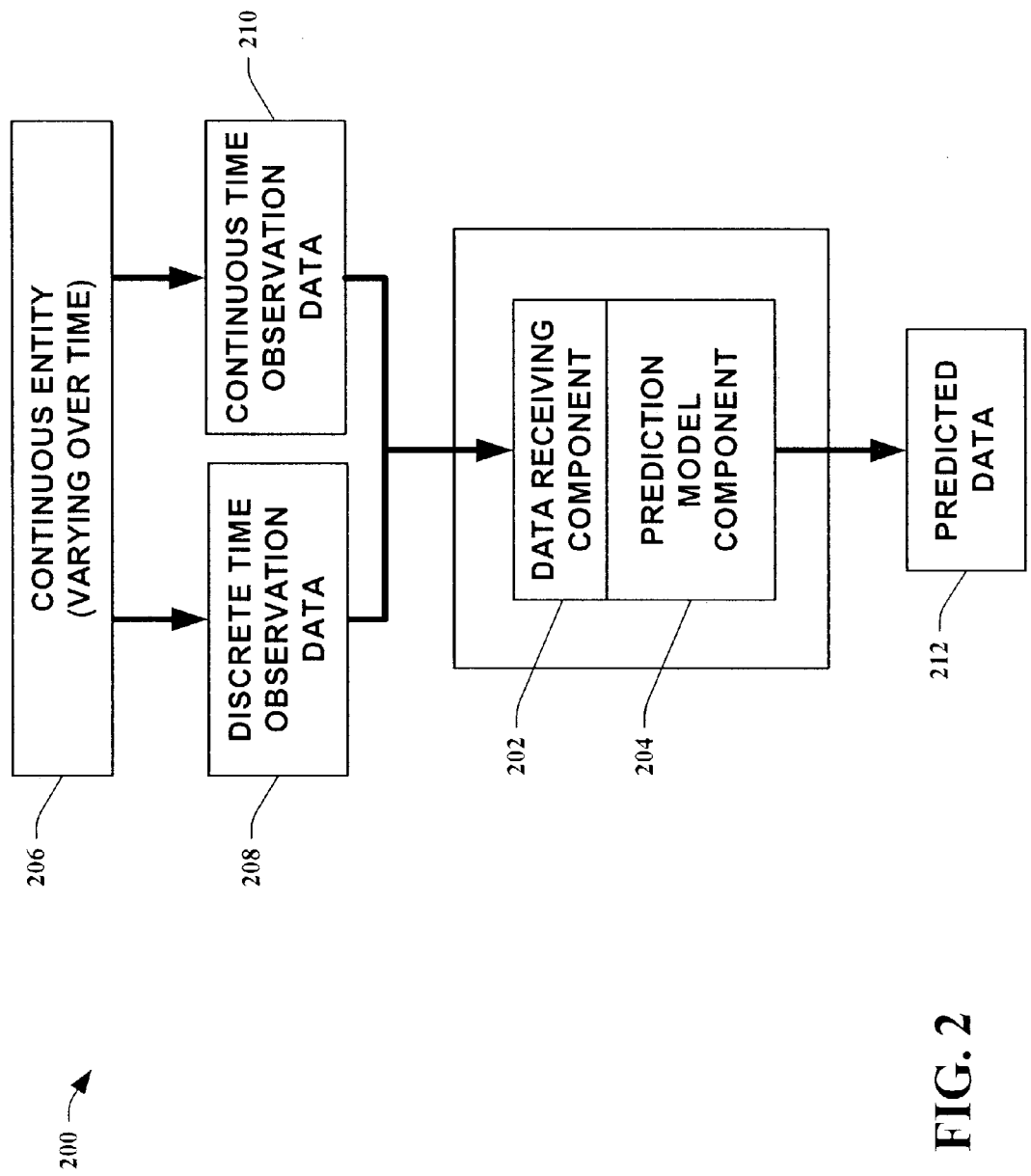
FIG. 2 is another block diagram of a time series prediction system in accordance with an aspect of the present invention.

Turning to FIG. 2, another block diagram of a time series prediction system 200 in accordance with an aspect of the present invention is illustrated. In this instance of the present invention, the system 200 is comprised of a data receiving component 202 and a prediction model component 204. Data that is to be input in the system 200 for processing is based upon a continuous entity 206 that varies over time. The entity 206 can be observed to obtain time observation data 208, 210. Discrete time observation data 208 and/or continuous time observation data 210 can be acquired from the continuous entity 206. Once the system 200 receives the time observation data 208, 210, it is processed by the prediction model component 204 to provide predicted data 212. The system 200 utilizing the present invention provides predicted values for both continuous and discrete variables. Those skilled in the art will recognize, contrary to the present invention, that ARMA models cannot provide discrete variable predictions.

Figure 3:
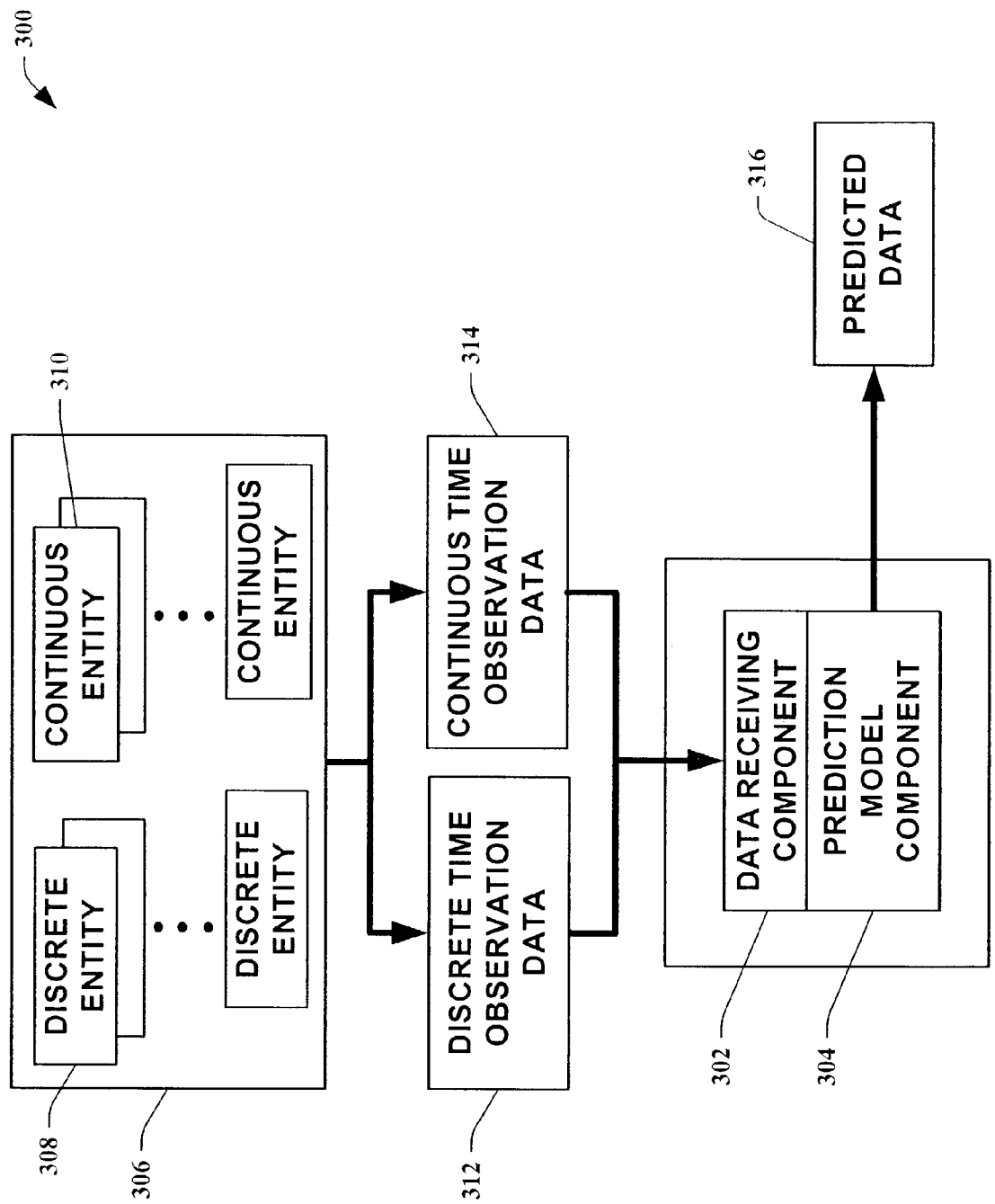
FIG. 3 is yet another block diagram of a time series prediction system in accordance with an aspect of the present invention.

Moving on to FIG. 3, yet another block diagram of a time series prediction system 300 in accordance with an aspect of the present invention is depicted. The system 300 is comprised of a data receiving component 302 and a prediction model component 304. Data, in this example, is provided by a group 306 consisting of a plurality of discrete entities 308 and/or a plurality of continuous entities 310. The group 306 varies over time and, thus, provides a source for time observation data, such as discrete time observation data 312 and/or continuous time observation data 314. The time observation data 312, 314 is received by the data receiving component 302 and processed by the prediction component 304 to produce predicted data 316. Thus, the present invention can be utilized to process single entity sources and/or multiple entity sources that can comprise discrete and/or continuous entities.

Figure 4:
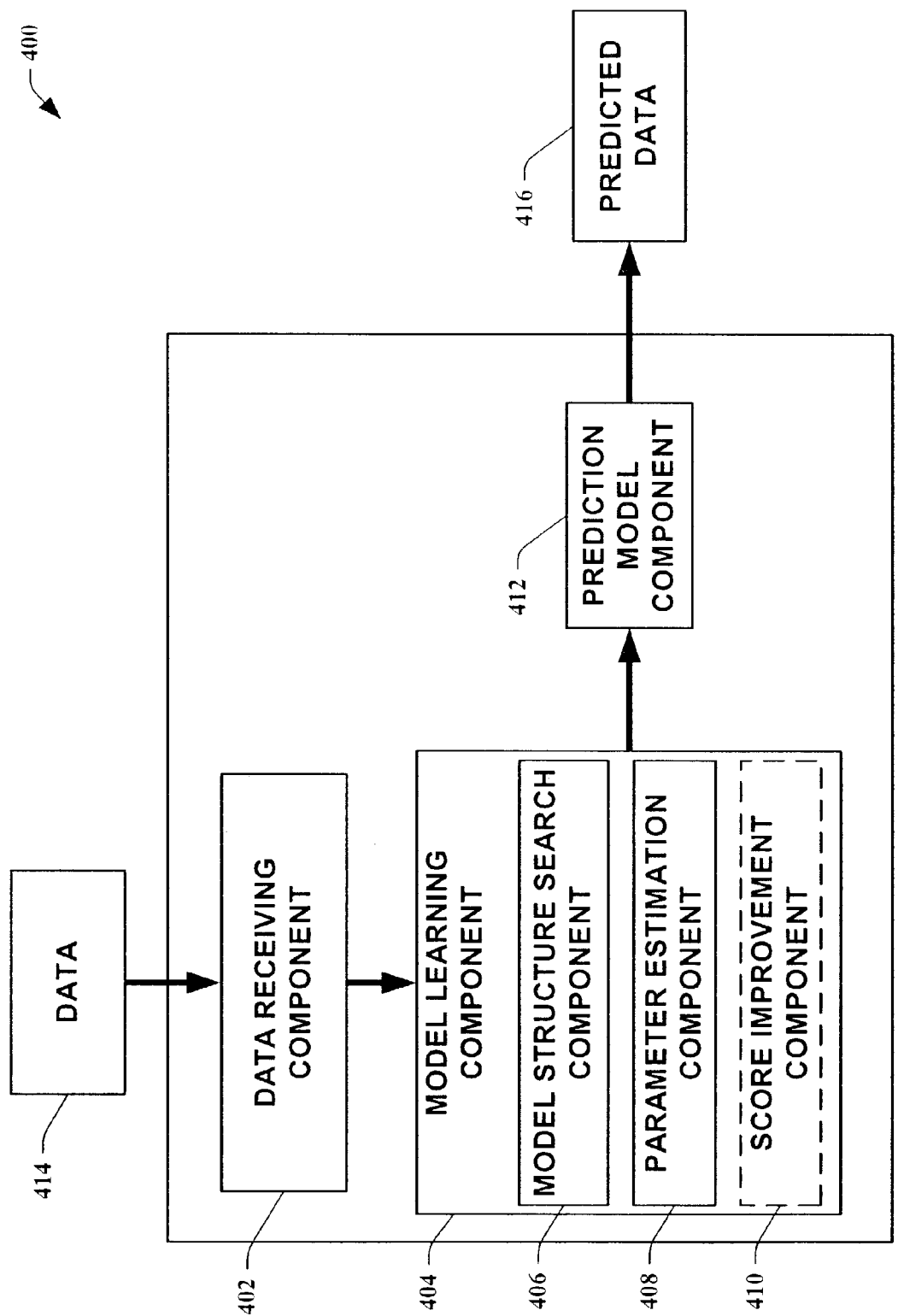
FIG. 4 is still yet another block diagram of a time series prediction system in accordance with an aspect of the present invention.

Referring to FIG. 4, still yet another block diagram of a time series prediction system 400 in accordance with an aspect of the present invention is shown. The system 400, in this example, is comprised of a data receiving component 402; a model learning component 404 comprising a model structure search component 406, a parameter estimation component 408, and an optional model score improvement component 410; and a prediction model component 412. Data 414 is received by the data receiving component 402 and passed to the model learning component 404. The model learning component 404 typically consists of two components 406, 408 that facilitate in constructing the prediction model 412. The model structure search component 406 evaluates various structures to determine a best or optimum model structure. The parameter estimation component 408 provides parameters for the optimum model structure. The techniques utilized for these functions are explained in detail infra. Optionally, the score improvement component 410 can be utilized to continually improve a structure's score until an optimum score is obtained. A greedy search algorithm along with a Bayesian Information Criteria score method can be employed within the model learning component 404. The prediction model component 412, generally, utilizes the best scored model structure to produce predicted data 416. The processes and techniques employed by each of these components are elaborated in detail infra.

Figure 5:
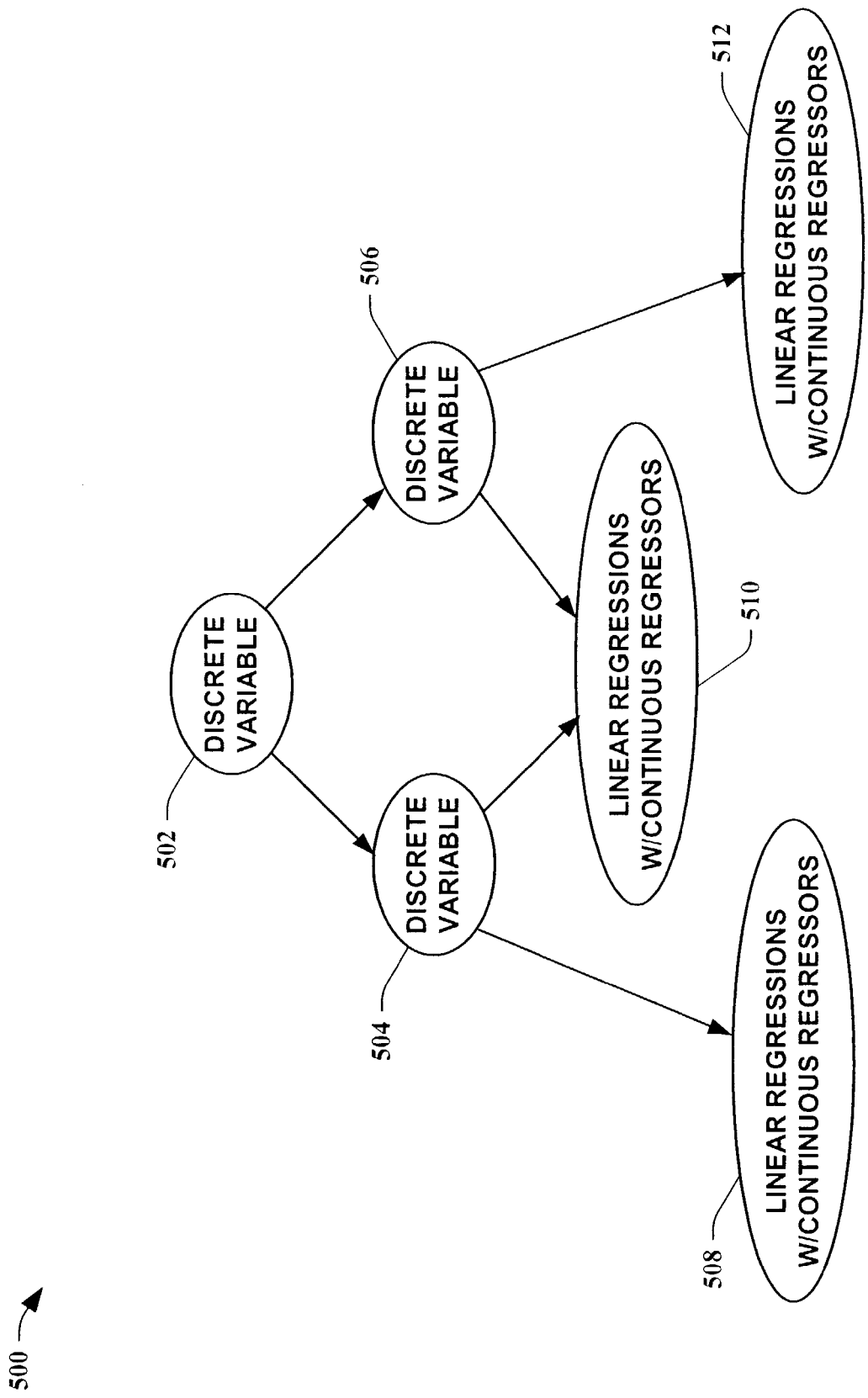
FIG. 5 is a diagram illustrating a directed acyclic graph for a continuous variable distribution in accordance with an aspect of the present invention.
Figure 6:
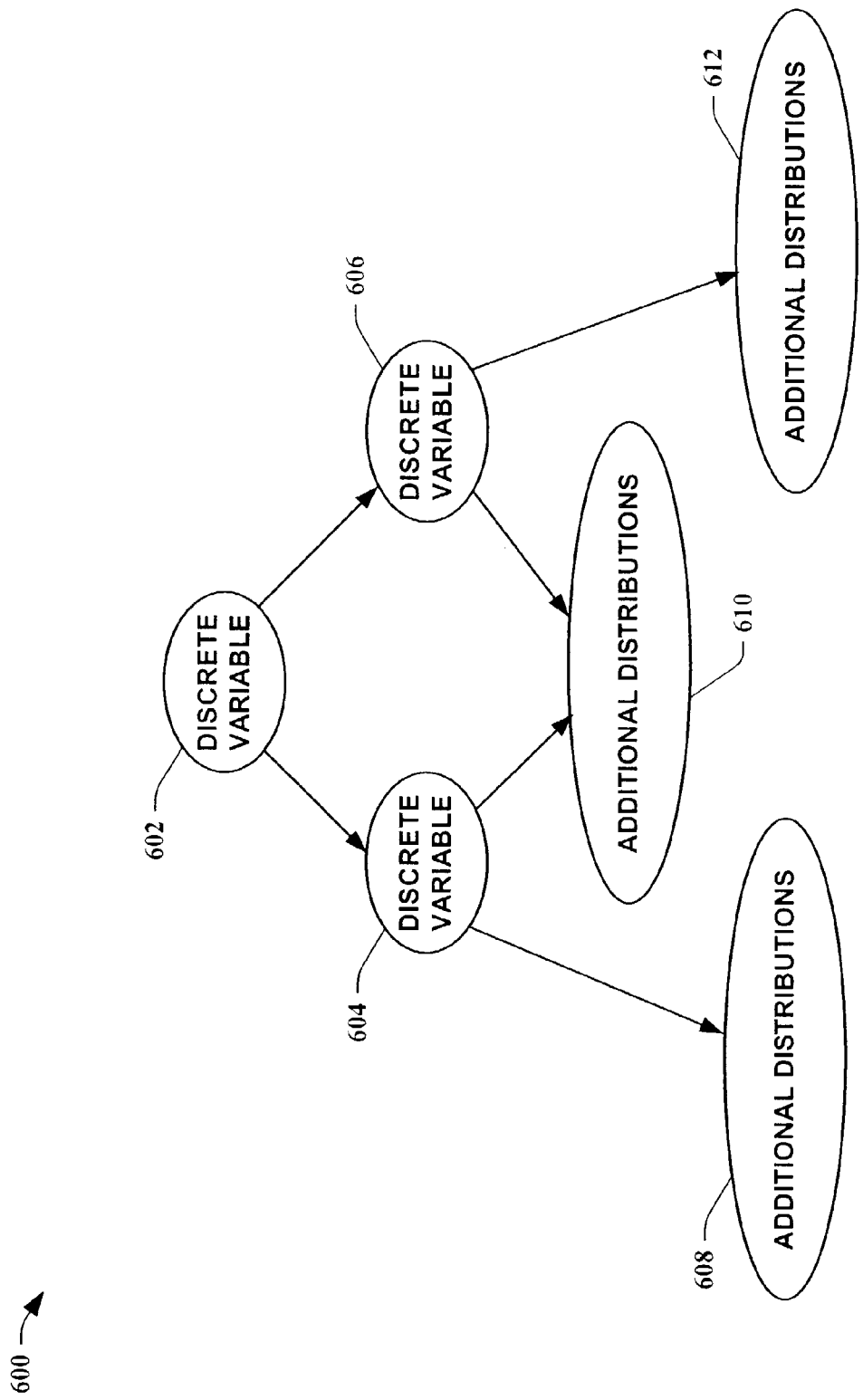
FIG. 6 is a diagram illustrating a directed acyclic graph for a discrete variable distribution in accordance with an aspect of the present invention.

The systems 100-400 of the present invention typically employ distributions for each continuous variable as a decision graph 500 having splits only on discrete variables 502-506 and having linear regressions with continuous regressors at all leaves 508-512 as shown in FIG. 5. Distributions for each discrete variable is constructed as a decision graph 600 having splits only on discrete variables 602-606 and having additional distributions at all leaves 608-612 as illustrated in FIG. 6. The present invention also further generalizes an ARMA model and incorporates cross-predictions to provide accurate prediction data for discrete and continuous variables.

Figure 7:
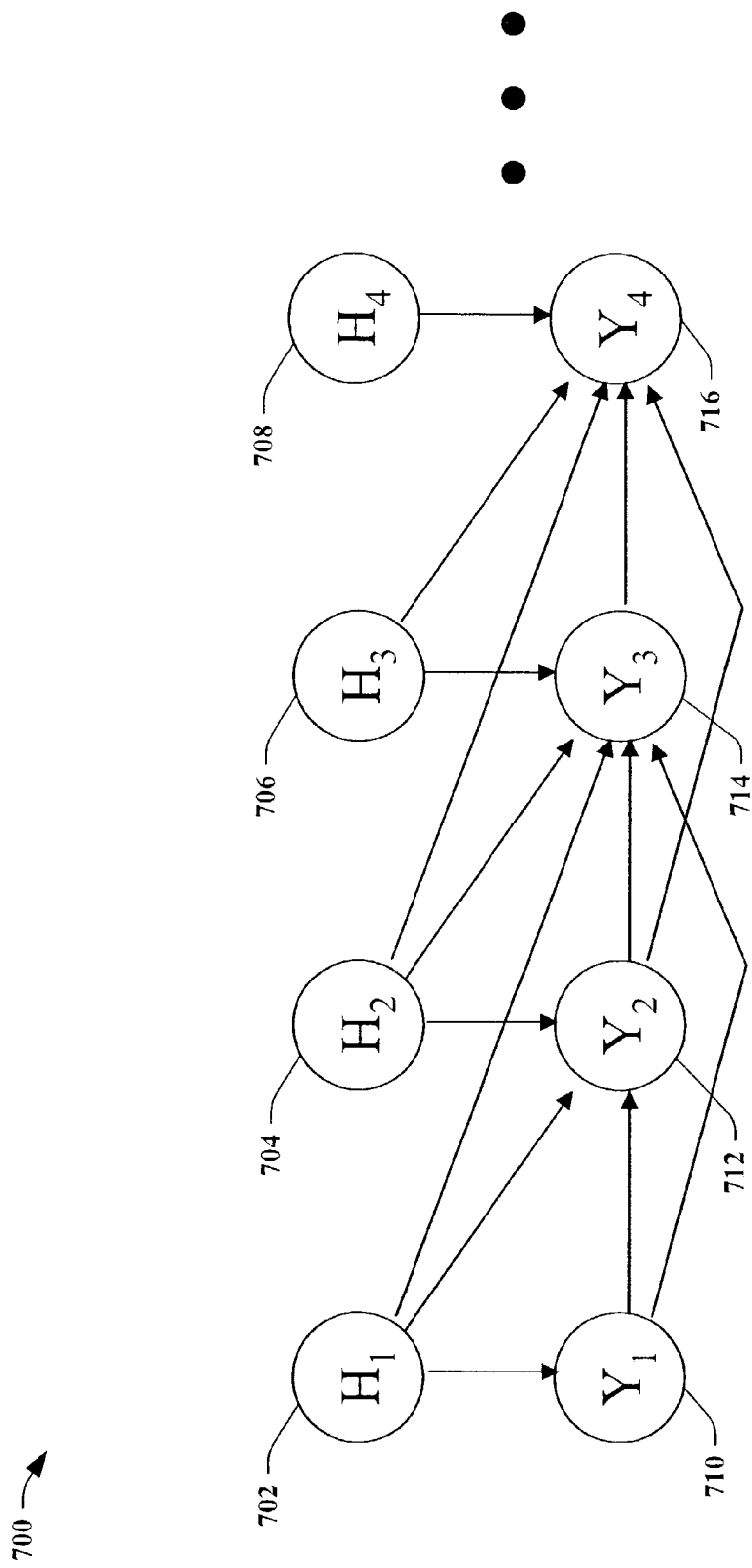
FIG. 7 is a diagram illustrating a directed acyclic graph for an ARMA(2,2) model in accordance with an aspect of the present invention.

For illustrative purposes, a class of ARMA(p,q) models (where "p" and "q" represent the order or length of the AR and MA, respectively) is provided, any member of which can be described by a directed acyclic graph (DAG) model (a.k.a., Bayesian network). For example, consider a set of observations $d = (y_1, \ldots, y_n)$, where $y_t$ is the observation of entity y at time t. The ARMA(2,2) model for this time series is described in part by a DAG model 700 illustrated in FIG. 7, where $Y_t$ is a continuous variable corresponding to the observation $y_t$, and $H_t$ is a hidden continuous variable associated with the observation at time t. Each H 702-708 has the same unknown mean and variance. Each Y 710-716 is the same deterministic, linear function of its parents, where coefficients are unknown. (An exception to the equality of functions occurs at the "boundary" of early times. In this example, $Y_1$ 710 is only a function of $H_1$ 702, and $Y_2$ 712 is only a function of $H_1$ 702, $H_2$ 704, and $Y_1$ 710.)

In general, a DAG model for an ARMA(p,q) model is one where a previous "p" Y's point to a given Y and a current H and previous "q" H's point to a given Y. Again each H has the same unknown mean and variance; and each Y (except for early times) is the same deterministic, linear function of its parents where the coefficients are unknown. The parameters of a model (unknown quantities) are estimated from data by a procedure described in Ansley, C. F. (1979); *An Algorithm for the Exact Likelihood of a Mixed Autoregressive-Moving Average Process*; Biometrik 66, 59-65. Ansley also illustrates how to do prediction—that is, given a model and its parameters, predict the mean and variance of y's not yet observed.

The present invention's class of models, dubbed "ARMAxp" class of models, includes the following generalizations of an ARMA class: (1) multiple observations per time slice; (2) some observations can be discrete/finite; and (3) the relationship between a variable and its parents is non-deterministic. For example, consider a set of continuous observations $y = ((y_{11}, y_{21}), (y_{12}, y_{22}), \ldots, (y_{1n}, y_{2n}))$ where $y_{ij}$ denotes the observation of the entity $y_i$ at time j. The set of observations $y_{i*} = (y_{i1}, y_{i2}, \ldots y_{in})$ is sometimes referred to as a "time tube" for entity $y_i$. Likewise, the set observations across time tubes for a fixed time t, that is $y_{*t} = (y_{1t}, y_{2t}, \ldots y_{mt})$, is sometimes referred to as a "time slice".

Figure 8:
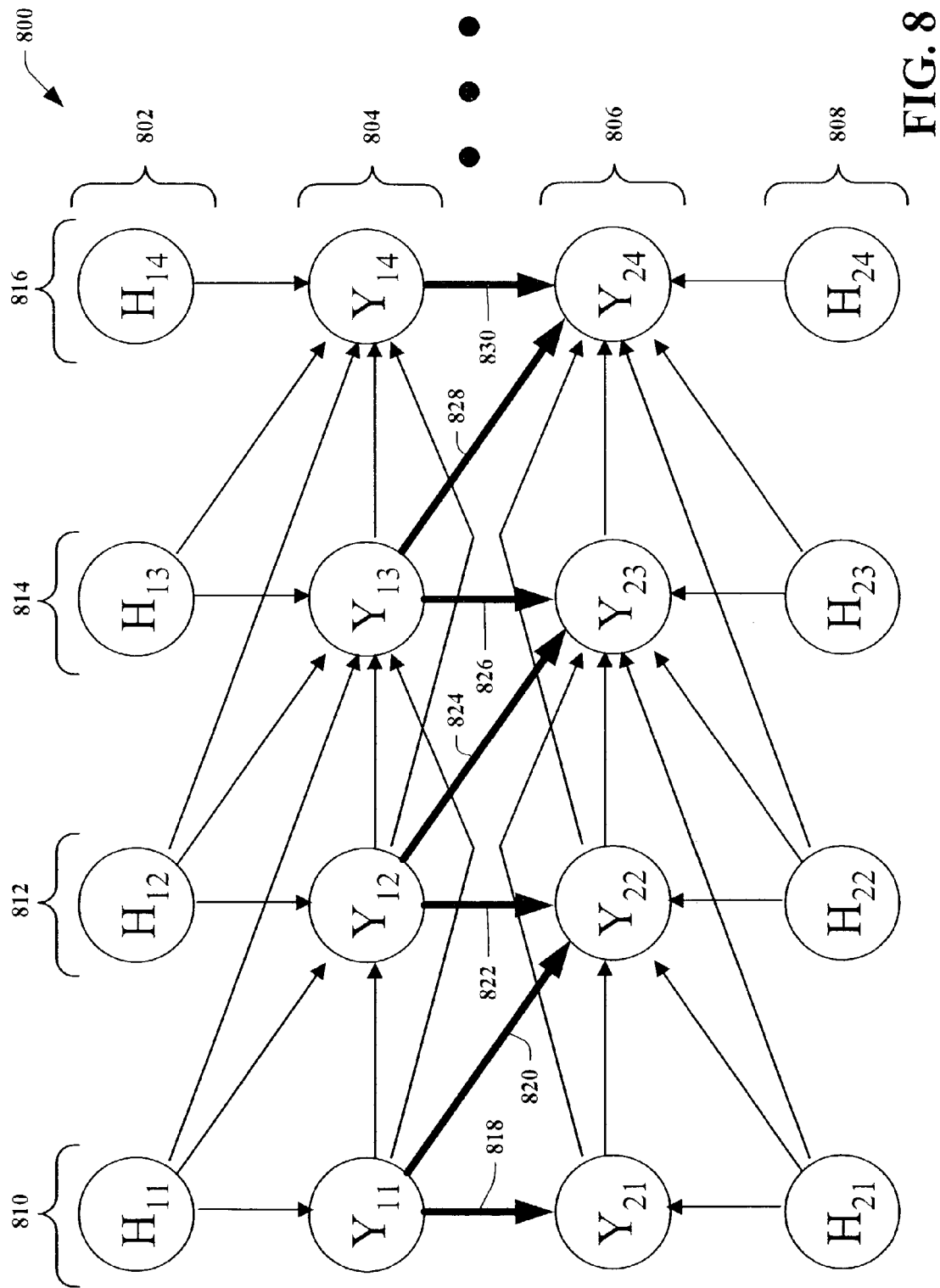
FIG. 8 is a diagram illustrating a directed acyclic graph for an ARMAxp model in accordance with an aspect of the present invention.

One ARMAxp model of the present invention that can be used to predict a two-tube series is illustrated by a DAG model 800 shown in FIG. 8. Here, each time tube 804-806 has an ARMA(2,2) model, but in addition, observations of $Y_{1t-1}$ and $Y_{1t}$ are also used to predict $Y_{2t}$ (denoted in FIG. 8 by bold arrows 818-830). The additional dependencies are called "cross-predictions"—hence the name ARMAxp. Furthermore, each $Y_{ij}$ is a linear regression (with independent Gaussian error) on its parents (i.e., regressors of a regression for $Y_{ij}$ are parents of $Y_{ij}$). Finally, with the exception of the early-time boundary, linear regressions have the same parameters at each time slice 810-816. Hidden (moving average) variables associated with time tube $Y_{1t}$ 804 are denoted by 802 and hidden (moving average) variables associated with time tube $Y_{2t}$ 806 are denoted by 808.

As another example, consider observations $y=((y_{11},y_{21}), (y_{12},y_{22}), \ldots, (y_{1n},y_{2n}))$, where each $y_{2t}$ is discrete, having a finite number of states. In this case, an example ARMAxp model corresponds to FIG. 8 with $H_{2t}$ variables 808 and outgoing arcs omitted. Local distributions for discrete variables are decision graphs with multinomial distributions at the leaves; and local distributions for continuous variables are decision graphs—containing splits on only discrete variables—with linear regressions on the continuous parents at the leaves as illustrated in FIGS. 5 and 6.

In general, the present invention can have multiple time tubes of continuous observations and multiple time tubes of discrete/finite observations. Here, discrete variables depend only on other discrete variables. The local distributions for the discrete variables are decision graphs with multinomial distributions at the leaves, and the local distributions for the continuous variables are decision graphs—containing splits on only discrete variables—with linear regressions on the continuous parents at the leaves. With the exception of the early-time boundary, local distributions corresponding to a given time tube have the same parameters at each time slice. Finally, arcs in the model can not form directed cycles.

Figure 9:
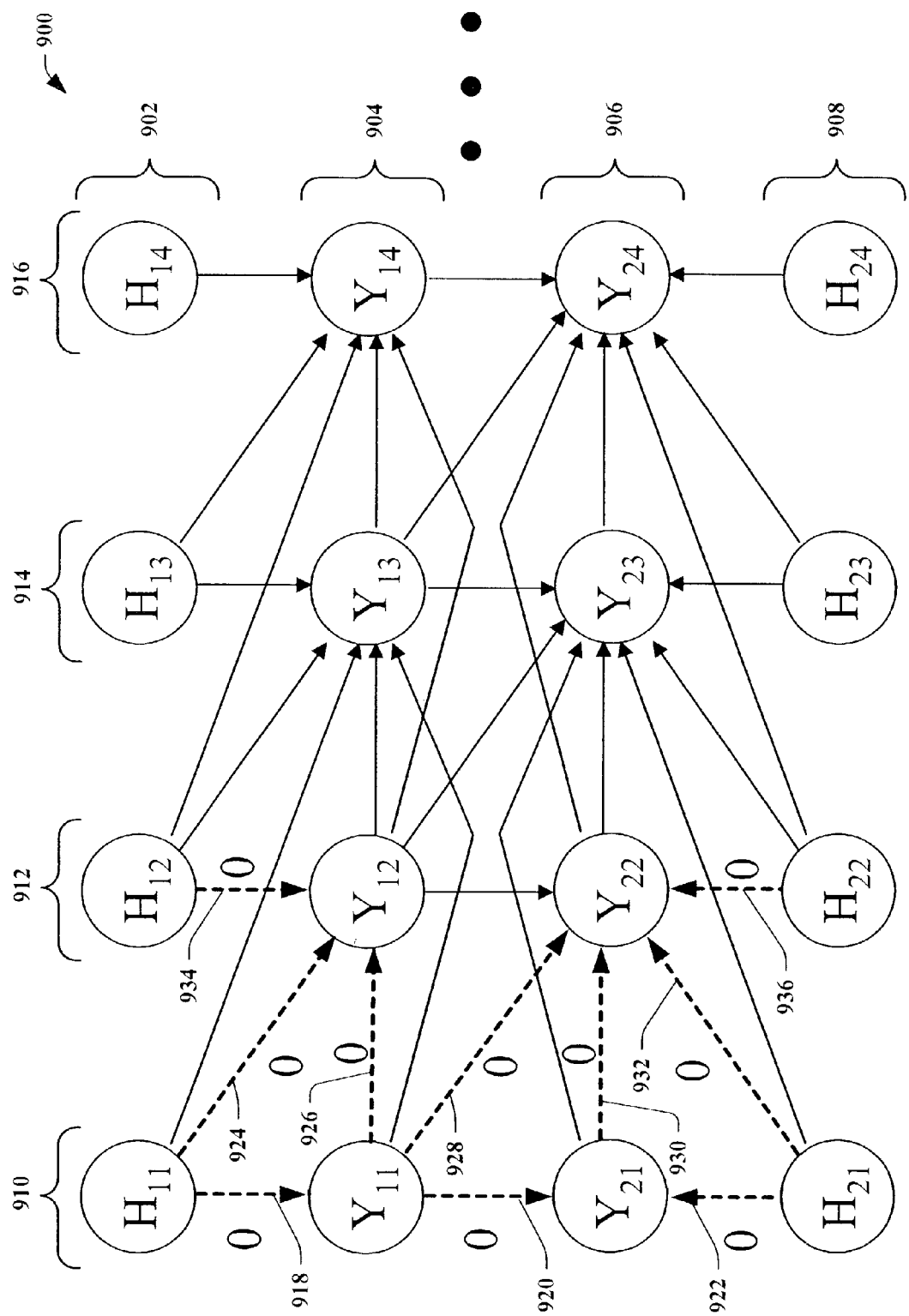
FIG. 9 is another diagram illustrating a directed acyclic graph for an ARMAxp model in accordance with an aspect of the present invention.

The local distributions for early time slices are modified versions of those for a regular slice. In particular, for each continuous $Y_{ij}$ that cannot have the same dependencies as a regular slice, linear coefficients from $Y_{ij}$'s continuous parents to $Y_{ij}$ are set to zero as illustrated in FIG. 9. For this illustration, $H_{1t}$ 902 are moving average variables for time tube $Y_{1t}$ 904 and $H_{2t}$ 908 are moving average variables for time tube $Y_{2t}$ 906. Time slices 910 and 912 represent "early time slices" while 914 and 916 represent "regular time slices." Early time slice linear coefficients 918-936 are zeroed and shown as dashed lines. Those practiced in the art will recognize that, with this specification, the joint distribution for variables in an ARMAxp model is a conditional Gaussian distribution.

To estimate the parameters of an ARMAxp model given data, the present invention uses an expectation-maximization (EM) algorithm to derive either a maximum a posterior (MAP) or maximum likelihood (ML) estimates. The application of EM to the present invention's model is straightforward to one skilled in the art. The E step (expectation step) of the algorithm is accomplished with an exact DAG model inference algorithm. Speedups to exact inference for the ARMAxp models are described infra. It should be noted that because the present invention is using an EM algorithm to estimate parameters, not all $Y_{ij}$s in the training data need be observed.

ARMAxp models as described are not identifiable. That is, an infinite number of parameter sets give rise to the same predictions. To make the models identifiable, the present invention sets the conditional variance of each continuous $Y_{ij}$ to be a small constant: $\epsilon$. Model predictions are fairly insensitive to $\epsilon$ when $\epsilon$ is small. It is recommended that a value of approximately 0.01 be utilized for the constant. It should also be noted that if a function relating each continuous $Y_{ij}$ to its parents is deterministic (as it is in ARMA), then the EM algorithm could not be used to estimate the parameters of the model from data. However, the present invention does not possess that limitation as found in ARMA.

To choose a structure of an ARMAxp model ("p", "q", and cross-predict arcs ("c")), the present invention typically utilizes a Bayesian Information Criteria (BIC) score—an asymptotic (heuristic) approximation to the marginal likelihood of the model structure. This score and its use are well known to those practiced in the art and is described in Schwarz, G. (1978); *Estimating the Dimension of a Model*; Annals of Statistics, 6:461-464.

In one instance of the present invention, a structural search for a time series with cross-predictors is performed as follows. First, a ranked list of MaxCross cross-predictors expected to have the most influence on the time series is created. The ranking can be in accordance with scores for independence tests between an observed variable for a time series, Y, and each considered cross-predictor. Independence test scores can be based on BIC scores, but other scores are possible. Independence test scoring is well known to those skilled in the art. A first model structure is then constructed according to an initial specification of "p", "q" and "c", where "p" and "q" have the same semantic as described supra, and "c" is a number of cross-predictors and cross-predictors are selected according to the ranked order. Parameters "p", "q", and "c" are given an initial value smaller than expected for a final model (e.g., a value of zero). A parameterization for this model structure is obtained by the EM algorithm and then the model is scored (e.g., by BIC score).

After the above initialization, the structural search contains a global model search with a local model search nested inside. The local model search selects a best model with a fixed number of auto-regressors, "p" (and varying "q" and "c") and a global model search selects a best model between the selected best local models with different "p's" by adding one to a value of "p" each time a global model score (e.g., BIC score) increases over a previous best global model score and stops when that is not the case.

The local model search scores a current model and then first tries to add moving average (MA) parameters to the model by iteratively adding one to a value of "q", until the score does not increase or until "p"="q". The moving average parameter search is always followed by an update of cross-predictors. Cross-predictors are updated by first trying to iteratively delete as many a possible (in ranking order) by decreasing a value of "c" by one until the score does not increase over the score for the previous best local model. If it was not possible to delete any cross-predictors, then cross-predictors are iteratively added (in ranking order) by increasing the value of "c" by one until the score does not increase over the score for previous best local model or until "c"=MaxCross.

During the local model search, each time a model structure is changed ("p", "q", or "c"), the parameterization for the current model is updated by running EM and then this model is scored (e.g., by BIC score). When the current model does not improve the score, the previous best local model is restored. The final model now constitutes the best local model for current "q".

To predict future observations given an ARMAxp model and its parameters, the present invention uses an exact DAG-model inference algorithm. In order to speedup the process, the following can be employed in one instance of the present invention. Instead of running inference from t=0 until the time for which prediction is done, a runtime speedup can be obtained by storing conditional distributions given current evidence for all (non-future) variables affecting variables in a part of a model which describes the future that the present invention is predicting. Those skilled in the art will realize that these conditional distributions represent the effect of all evidence up until the start of prediction and inference can be started at this point instead of at time t=0.

It should be noted that use of DAG model inference makes it possible to predict future values even when portions of the time series are unobserved. Additionally, it should be noted that, if all observations correspond to discrete/finite values, the present invention's algorithm degenerates to the one described in Meek, et al.

In view of the exemplary systems shown and described above, methodologies that may be implemented in accordance with the present invention will be better appreciated with reference to the flow charts of FIGS. 10-13. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Figure 10:
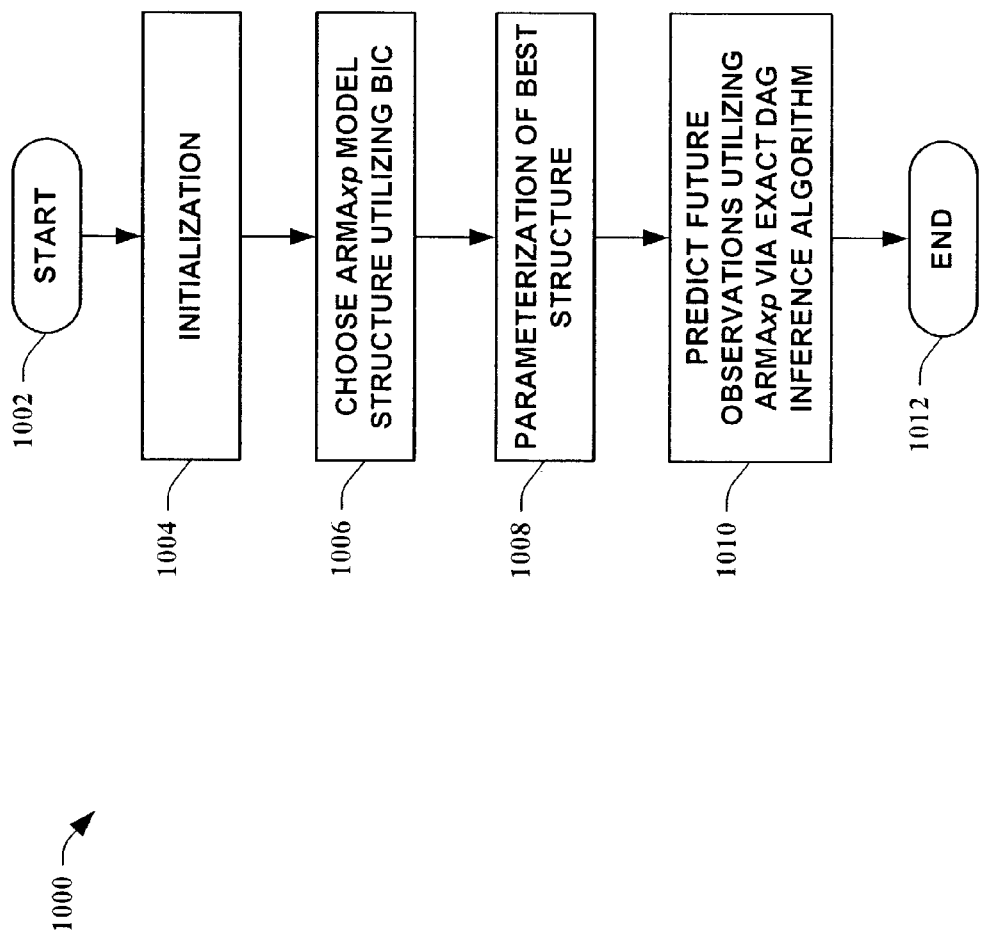
FIG. 10 is a flow diagram of a method for predicting time series values in accordance with an aspect of the present invention.

In FIG. 10, a flow diagram of a method 1000 for predicting time series values in accordance with an aspect of the present invention is illustrated. The method 1000 starts 1002 by performing a data initialization 1004. An ARMAxp model structure is then chosen employing a scoring method such as, for example, a Bayesian Information Criteria (BIC) score 1006. If a BIC score is utilized, it provides an asymptotic approximation to a marginal likelihood of the ARMAxp model structure. The structure can be refined to improve upon the BIC score until an optimum score is achieved. A method of model searching for one instance of the present invention is discussed infra, see FIGS. 11-13. In brief, an iterative process is utilized to find an optimum model. For each model considered during the model search, local distributions of early time slice linear coefficients are first set to zero. This simplifies the method 1000 by making a joint distribution for variables in an ARMAxp model into a conditional Gaussian distribution. Parameters of an ARMAxp model are then estimated utilizing an expectation-maximization (EM) algorithm to derive either a maximum a posterior or maximum likelihood estimate, where the ARMAxp model is made identifiable by setting the conditional variance of each continuous "time tube" variable to a small constant value 1008. By setting the conditional variance small, its impact on model predictions is negligible. Once an ARMAxp model is defined, it is employed to predict future time observation data 1010, ending the flow 1012. The ARMAxp model utilizes an exact directed acyclic graph (DAG) inference algorithm to facilitate predictions.

Figure 11:
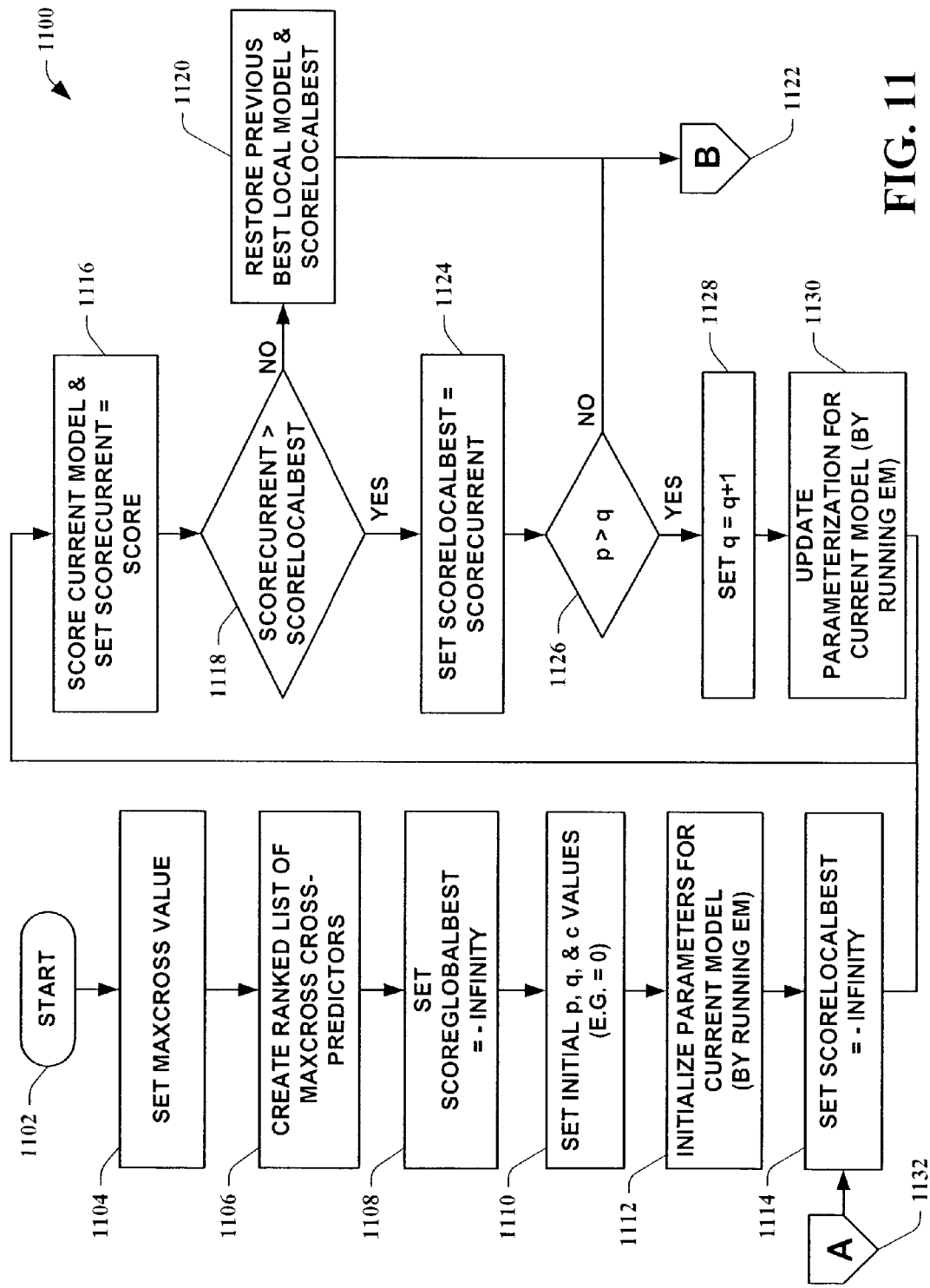
FIG. 11 is a flow diagram of a method for structural model searching for a time series with cross-predictors in accordance with an aspect of the present invention.

As mentioned supra, a search function can be employed to facilitate finding an optimum ARMAxp model. Turning to FIG. 11, a flow diagram of a method 1100 for structural model searching for a time series with cross-predictors in accordance with an aspect of the present invention is shown. The method 1100 starts 1102 by setting a maxcross value for a search 1104. A ranked list is then created of maxcross cross-predictors that are expected to have the most impact on a time series 1106. A variable, "ScoreGlobalBest," is then set to minus infinity 1108. ScoreGlobalBest represents the best overall score and is used to track the optimum structural model. Parameters for an ARMAxp model structure are then initialized such as setting "p", "q" and "c" to zero 1110. Parameterization for this "current" model is then initialized by utilizing an expectation-maximization (EM) algorithm 1112. A variable, "ScoreLocalBest," is then set to minus infinity 1114. ScoreLocalBest tracks the best local model which is nested within the optimum structural model search or best global model search. A variable, "ScoreCurrent," is set equal to a score of the current ARMAxp model being evaluated 1116. A determination is then made as to whether ScoreCurrent is greater than ScoreLocalBest 1118. If it is less than or equal to it, a previous best local model and ScoreLocalBest score are restored 1120. The method 1100 at this point continues to a further portion of the method 1100 represented by off-page connector "B" 1122, discussed in further detail infra (see FIG. 12). However, if ScoreCurrent is greater than ScoreLocalBest 1118, ScoreLocalBest is set equal to ScoreCurrent 1124. A determination is then made as to whether "p" is greater than "q" for the ARMAxp structure 1126. If no, the method 1100 continues in a further portion of the method 1100 represented by off-page connector "B" 1122, discussed in further detail infra (see FIG. 12). If, however, "p" is greater than "q", "q" is incremented by a value of one 1128. The current model parameterization is then updated by utilizing the EM algorithm 1130. The method 1100 then cycles back to scoring the current model and setting ScoreCurrent equal to the new score 1116 as described supra.

Figure 12:
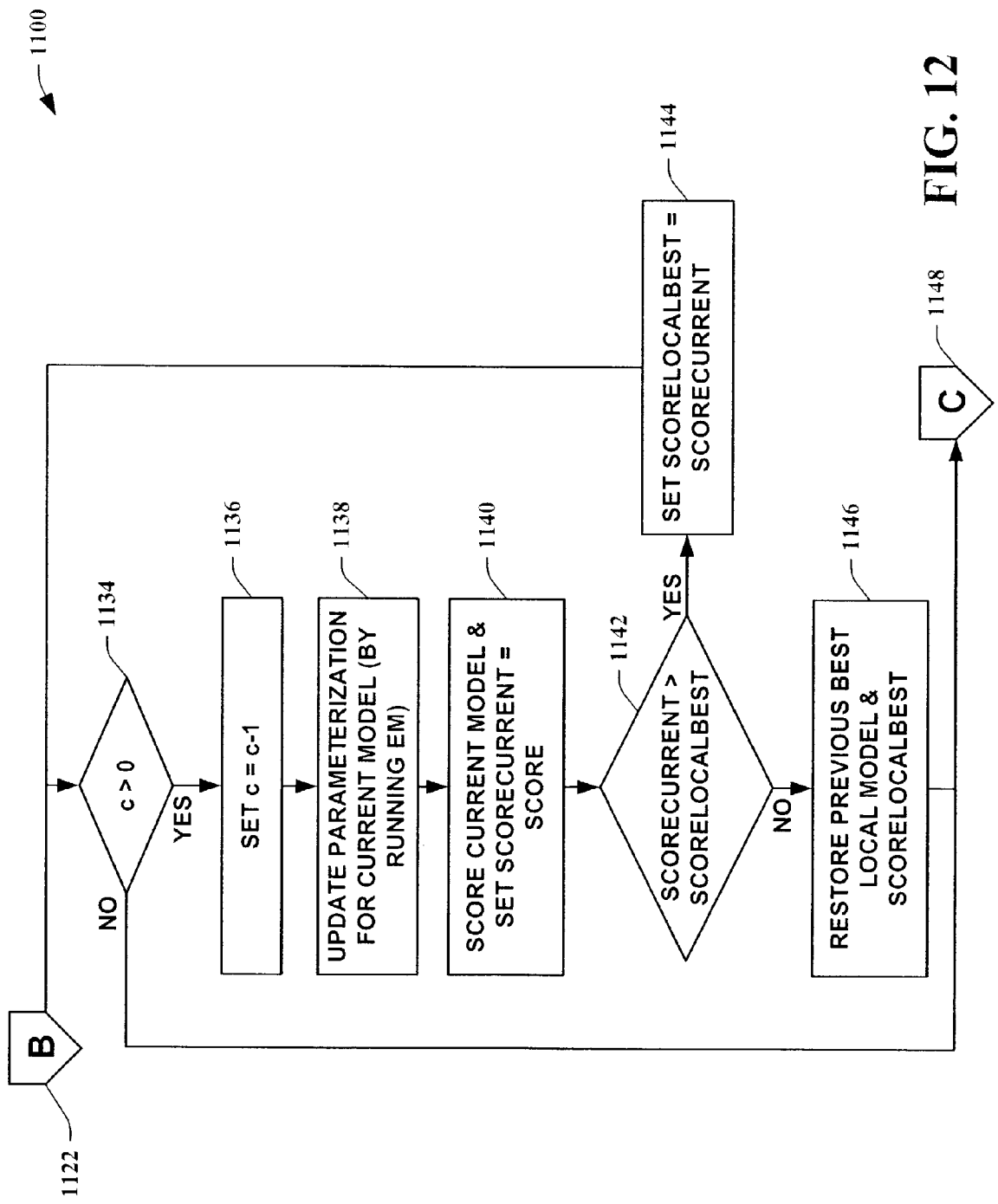
FIG. 12 is a continuation of the flow diagram of the method of structural model searching for a time series with cross-predictors in accordance with an aspect of the present invention.

Turning to FIG. 12, a continuation of the flow diagram of the method 1100 for structural model searching for a time series with cross-predictors in accordance with an aspect of the present invention is depicted. Off-page connector "B" 1122 begins by either ScoreCurrent not being greater than ScoreLocalBest 1118 or "p" not being greater than "q" 1126. If either of these two conditions is met, a determination is made as to whether "c" is greater than zero 1134. If no, the method 1100 continues in a further portion of the method 1100 represented by off-page connector "C" 1148, discussed in further detail infra (see FIG. 13). If, however, "c" is greater than zero 1134, a value of one is subtracted from "c" 1136. The current model parameterization is then updated via the EM algorithm 1138. The current model is then scored and ScoreCurrent is set equal to this score 1140. A determination is then made as to whether ScoreCurrent is greater than ScoreLocalBest 1142. If no, the previous best local model is restored and its score is utilized for ScoreLocalBest 1146. The method 1100 at this point continues to a further portion of the method 1100 represented by off-page connector "C" 1148, discussed in further detail infra (see FIG. 13). If, however, ScoreCurrent is greater than ScoreLocalBest, ScoreLocalBest is set equal to ScoreCurrent 1144. At this point, the method 1100 cycles back to determining if "c" is greater than zero again 1134, described supra.

Figure 13:
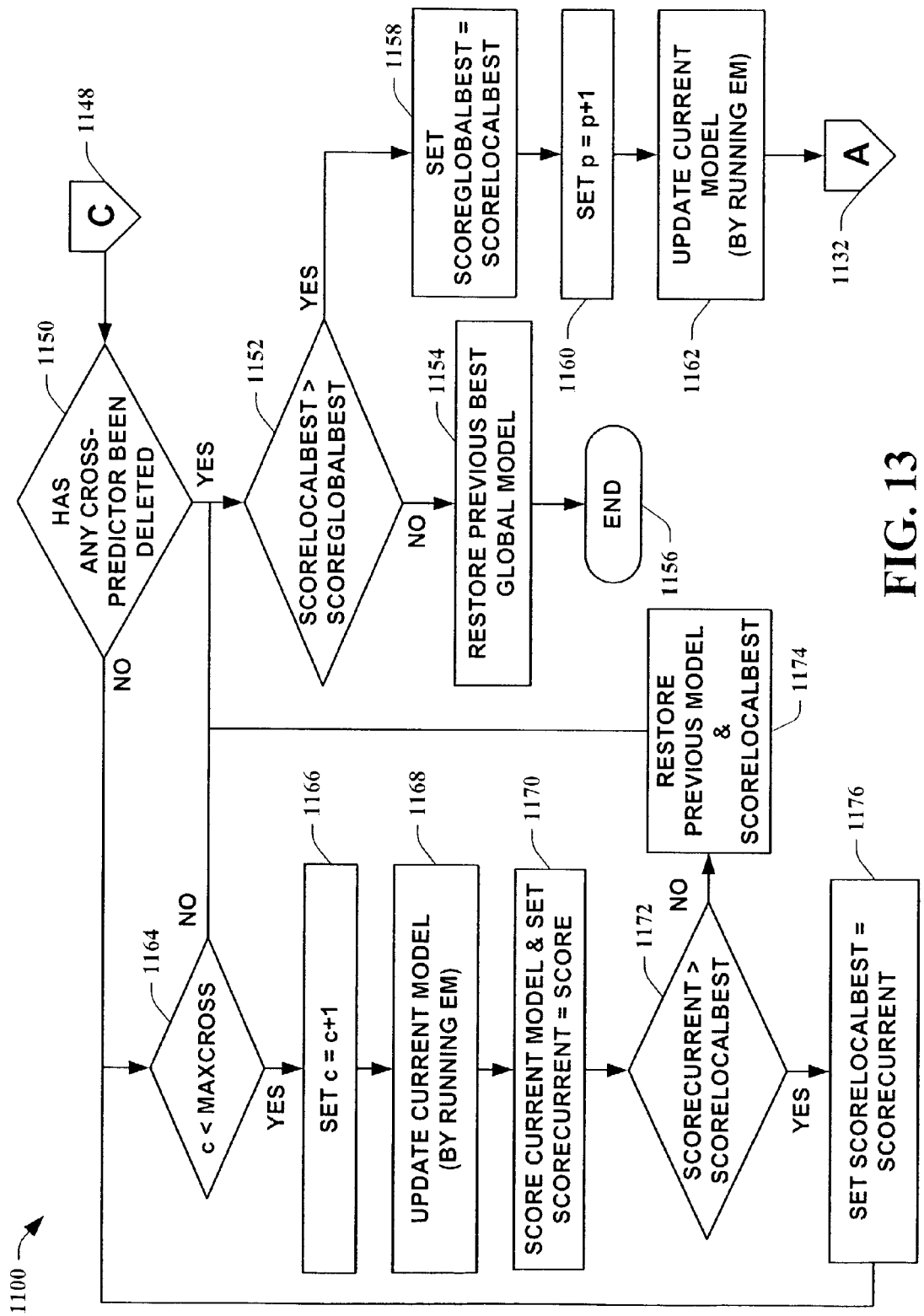
FIG. 13 is another continuation of the flow diagram of the method of structural model searching for a time series with cross-predictors in accordance with an aspect of the present invention.

Moving on to FIG. 13, another continuation of the flow diagram of the method 1100 for structural model searching for a time series with cross-predictors in accordance with an aspect of the present invention is illustrated. Off-page connector "C" 1148 begins by either ScoreCurrent not being greater than ScoreLocalBest 1142 or "c" not being greater than zero 1134. If either of these two conditions is met, a determination is made as to whether any cross-predictor has been deleted 1150. If yes, a determination is made as to whether ScoreLocalBest is greater than ScoreGlobalBest 1152. If no, the previous best global model is restored 1154, ending the flow 1156. If, however, ScoreLocalBest is greater than ScoreGlobalBest 1152, ScoreGlobalBest is set equal to ScoreLocalBest 1158. Parameter "p" is then incremented by a value of one 1160. The current model is then updated utilizing the EM algorithm 1162. At this point in the method 1100, it cycles back to setting ScoreLocalBest to minus infinity 1114 via off-page connector "A" 1132 (connected to FIG. 11).

If, however, no cross-predictor has been deleted 1150, a determination is then made as to whether "c" is less than maxcross 1164. If no, the method 1100 continues with determining if ScoreLocalBest is greater than ScoreGlobalBest 1152 described supra. If, however, "c" is less than maxcross 1164, it is incremented by a value of one 1166. The current model is then updated by employing the EM algorithm 1168. The current model is then scored and ScoreCurrent is set equal to its score 1170. A determination is then made as to whether ScoreCurrent is greater than ScoreLocalBest 1172. If yes, ScoreLocalBest is set equal to ScoreCurrent 1176. The method 1100 then cycles back to determining whether "c" is less than maxcross 1164, described supra. If, however, ScoreCurrent is not greater than ScoreLocalBest 1172, the previous model and ScoreLocalBest are restored 1174. The method 1100 then continues with determining if ScoreLocalBest is greater than ScoreGlobalBest 1152 described supra.

Those skilled in the art will appreciate that the search algorithm described supra is not the only method that can be employed by the present invention. Any method that can be utilized to obtain an optimum configuration is within the scope of the present invention.

Figure 14:
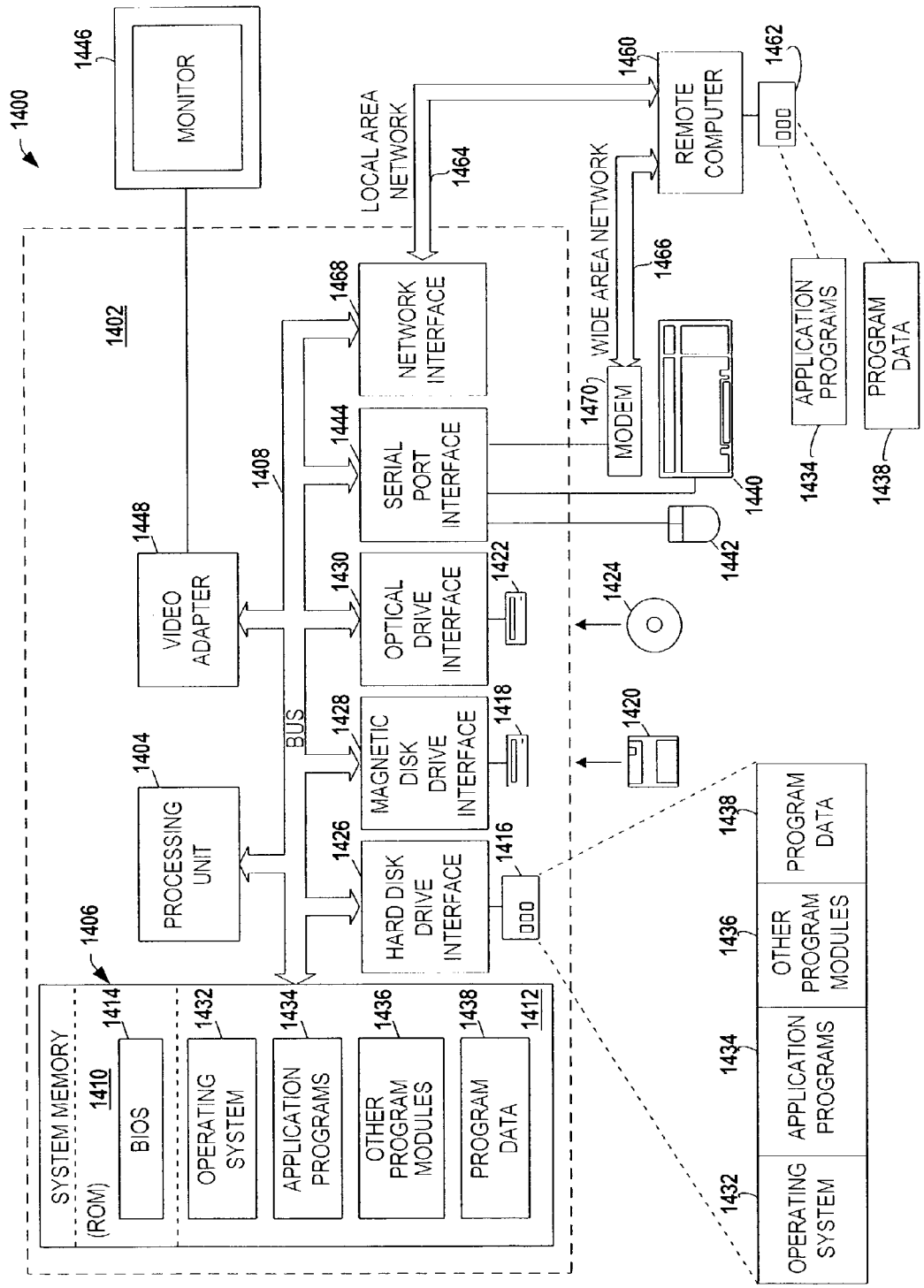
FIG. 14 illustrates an example operating environment in which the present invention can function.

In order to provide additional context for implementing various aspects of the present invention, FIG. 14 and the following discussion are intended to provide a brief, general description of a suitable computing environment 1400 in which the various aspects of the present invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

As used in this application, the term "component" is intended to refer to a computer-related entity, either hardware, a combination of hardware and software, software, or software in execution. For example, a component may be, but is not limited to, a process running on a processor, a processor, an object, an executable, a thread of execution, a program, and a computer. By way of illustration, an application running on a server and/or the server can be a component. In addition, a component may include one or more subcomponents.

With reference to FIG. 14, an exemplary system environment 1400 for implementing the various aspects of the invention includes a conventional computer 1402, including a processing unit 1404, a system memory 1406, and a system bus 1408 that couples various system components, including the system memory, to the processing unit 1404. The processing unit 1404 may be any commercially available or proprietary processor. In addition, the processing unit may be implemented as multi-processor formed of more than one processor, such as may be connected in parallel.

The system bus 1408 may be any of several types of bus structure including a memory bus or memory controller, a peripheral bus, and a local bus using any of a variety of conventional bus architectures such as PCI, VESA, Microchannel, ISA, and EISA, to name a few. The system memory 1406 includes read only memory (ROM) 1410 and random access memory (RAM) 1412. A basic input/output system (BIOS) 1414, containing the basic routines that help to transfer information between elements within the computer 1402, such as during start-up, is stored in ROM 1410.

The computer 1402 also may include, for example, a hard disk drive 1416, a magnetic disk drive 1418, e.g., to read from or write to a removable disk 1420, and an optical disk drive 1422, e.g., for reading from or writing to a CD-ROM disk 1424 or other optical media. The hard disk drive 1416, magnetic disk drive 1418, and optical disk drive 1422 are connected to the system bus 1408 by a hard disk drive interface 1426, a magnetic disk drive interface 1428, and an optical drive interface 1430, respectively. The drives 1416-1422 and their associated computer-readable media provide nonvolatile storage of data, data structures, computer-executable instructions, etc. for the computer 1402. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, can also be used in the exemplary operating environment 1400, and further that any such media may contain computer-executable instructions for performing the methods of the present invention.

A number of program modules may be stored in the drives 1416-1422 and RAM 1412, including an operating system 1432, one or more application programs 1434, other program modules 1436, and program data 1438. The operating system 1432 may be any suitable operating system or combination of operating systems. By way of example, the application programs 1434 can include a time series data prediction component that employs, for example, an autoregressive, moving average cross-predictions (ARMAxp) model to predict values of discrete and continuous time observation data in accordance with an aspect of the present invention.

A user can enter commands and information into the computer 1402 through one or more user input devices, such as a keyboard 1440 and a pointing device (e.g., a mouse 1442). Other input devices (not shown) may include a microphone, a joystick, a game pad, a satellite dish, wireless remote, a scanner, or the like. These and other input devices are often connected to the processing unit 1404 through a serial port interface 1444 that is coupled to the system bus 1408, but may be connected by other interfaces, such as a parallel port, a game port or a universal serial bus (USB). A monitor 1446 or other type of display device is also connected to the system bus 1408 via an interface, such as a video adapter 1448. In addition to the monitor 1446, the computer 1402 may include other peripheral output devices (not shown), such as speakers, printers, etc.

It is to be appreciated that the computer 1402 can operate in a networked environment using logical connections to one or more remote computers 1460. The remote computer 1460 may be a workstation, a server computer, a router, a peer device or other common network node, and typically includes many or all of the elements described relative to the computer 1402, although, for purposes of brevity, only a memory storage device 1462 is illustrated in FIG. 14. The logical connections depicted in FIG. 14 can include a local area network (LAN) 1464 and a wide area network (WAN) 1466. Such networking environments are commonplace in offices, enterprise-wide computer networks, intranets and the Internet.

When used in a LAN networking environment, for example, the computer 1402 is connected to the local network 1464 through a network interface or adapter 1468. When used in a WAN networking environment, the computer 1402 typically includes a modem (e.g., telephone, DSL, cable, etc.) 1470, or is connected to a communications server on the LAN, or has other means for establishing communications over the WAN 1466, such as the Internet. The modem 1470, which can be internal or external relative to the computer 1402, is connected to the system bus 1408 via the serial port interface 1444. In a networked environment, program modules (including application programs 1434) and/or program data 1438 can be stored in the remote memory storage device 1462. It will be appreciated that the network connections shown are exemplary and other means (e.g., wired or wireless) of establishing a communications link between the computers 1402 and 1460 can be used when carrying out an aspect of the present invention.

In accordance with the practices of persons skilled in the art of computer programming, the present invention has been described with reference to acts and symbolic representations of operations that are performed by a computer, such as the computer 1402 or remote computer 1460, unless otherwise indicated. Such acts and operations are sometimes referred to as being computer-executed. It will be appreciated that the acts and symbolically represented operations include the manipulation by the processing unit 1404 of electrical signals representing data bits which causes a resulting transformation or reduction of the electrical signal representation, and the maintenance of data bits at memory locations in the memory system (including the system memory 1406, hard drive 1416, floppy disks 1420, CD-ROM 1424, and remote memory 1462) to thereby reconfigure or otherwise alter the computer system's operation, as well as other processing of signals. The memory locations where such data bits are maintained are physical locations that have particular electrical, magnetic, or optical properties corresponding to the data bits.

Figure 15:
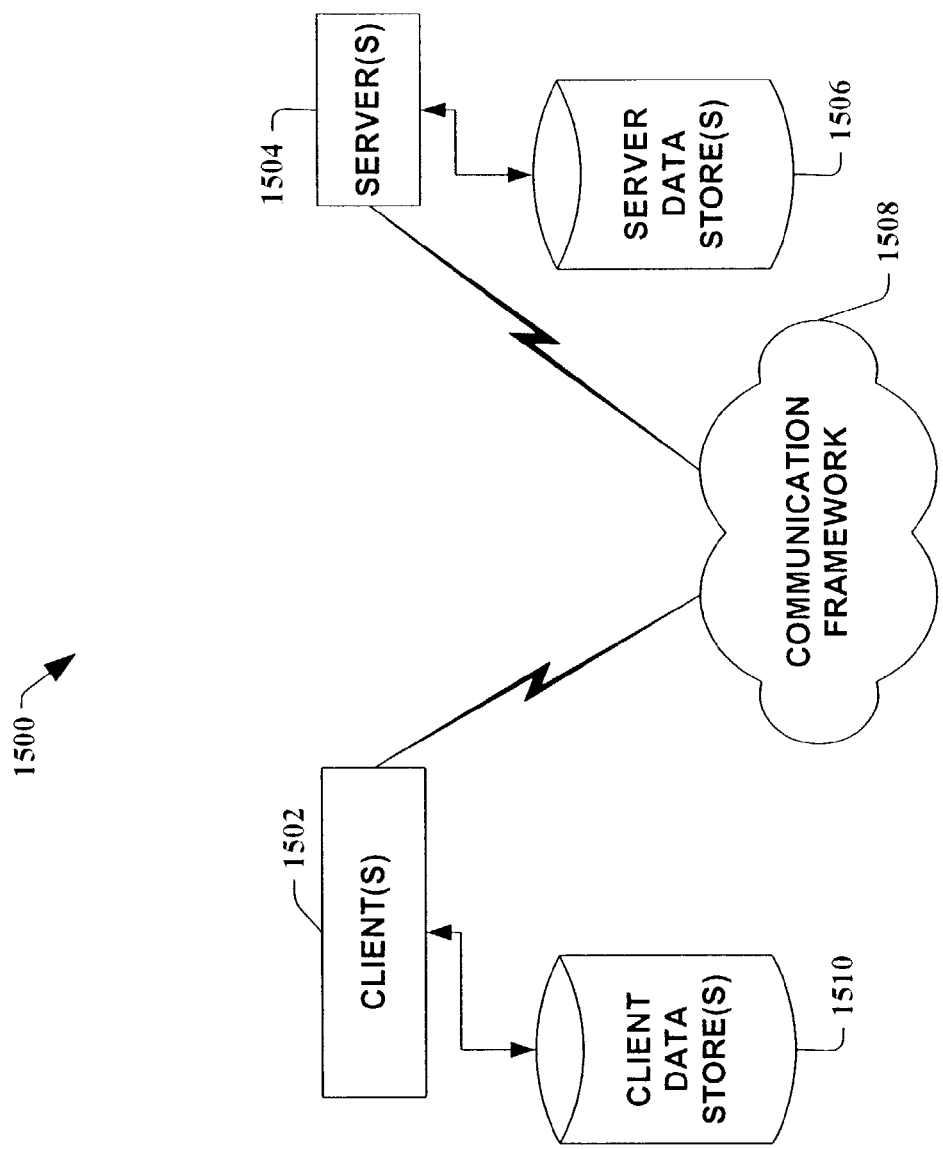
FIG. 15 illustrates another example operating environment in which the present invention can function.

FIG. 15 is another block diagram of a sample computing environment 1500 with which the present invention can interact. The system 1500 further illustrates a system that includes one or more client(s) 1502. The client(s) 1502 can be hardware and/or software (e.g., threads, processes, computing devices). The system 1500 also includes one or more server(s) 1504. The server(s) 1504 can also be hardware and/or software (e.g., threads, processes, computing devices). The servers 1504 can house threads to perform transformations by employing the present invention, for example. One possible communication between a client 1502 and a server 1504 may be in the form of a data packet adapted to be transmitted between two or more computer processes. The system 1500 includes a communication framework 1508 that can be employed to facilitate communications between the client(s) 1502 and the server(s) 1504. The client(s) 1502 are operably connected to one or more client data store(s) 1510 that can be employed to store information local to the client(s) 1502. Similarly, the server(s) 1504 are operably connected to one or more server data store(s) 1506 that can be employed to store information local to the servers 1504.

In one instance of the present invention, a data packet is transmitted between two or more computer components that facilitates predicting values of discrete and/or continuous time observation data in a time series, the data packet comprised of, at least in part, time observation prediction data based, at least in part, on an autoregressive, moving average cross-predictions (ARMAxp) model, wherein conditional variance of each continuous variable is fixed to a small positive value.

In another instance of the present invention, a computer readable medium storing computer executable components of a system that facilitates predicting values of time observation data in a time series is comprised of an autoregressive, moving average cross-predictions (ARMAxp) model that predicts values of the discrete and/or continuous time observation data, wherein conditional variance of each continuous variable is fixed to a small positive value.

It is to be appreciated that the systems and/or methods of the present invention can be utilized in a data prediction scheme for facilitating computer components and non-computer related components alike. Further, those skilled in the art will recognize that the systems and/or methods of the present invention can be employed in a vast array of electronic related technologies, including, but not limited to, computers, servers and/or handheld electronic devices and the like.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates predicting values of time observation data in a time series, comprising:

at least one processor;

a memory communicatively coupled to the processor, the memory having stored therein processor-executable instructions configured to implement the time series prediction system including:

a component that receives a subset of time observation data that includes observations of at least one entity, the time observation data comprising at least one selected from the group consisting of discrete time observation data and continuous time observation data; and an autoregressive, moving average cross-predictions (AR-MAxp) model that predicts values of the time observation data, the ARMAxp model includes at least one variable that corresponds to the observations associated with the at least one entity and conditional variance of each continuous time tube variable is fixed to a small positive value.

2. The system of claim 1, the continuous time tube variable is approximately equal to a value of 0.01.

3. The system of claim 1, the at least one entity includes a continuous entity that varies over time.

4. The system of claim 1, the at least one entity includes a plurality of discrete and continuous entities that vary over time.

5. The system of claim 1, a distribution of each continuous variable is a decision graph having splits only on discrete variables and having linear regressions with continuous regressors at all leaves, and a distribution of each discrete variable is a decision graph having splits only on discrete variables and having additional distributions at all leaves.

6. The system of claim 5, the ARMAxp model employs exact directed acyclic graph (DAG) model inference to predict future observations of the at least one entity.

7. The system of claim 5, further comprising an expectation maximization (EM) component that learns the model based on EM.

8. The system of claim 1, further comprising a search component that identifies a model structure.

9. The system of claim 8, the search component improves a model score.

10. The system of claim 9, the search component utilizes a greedy search algorithm to improve the model score.

11. The system of claim 9, the model score is Bayesian Information Criteria (BIC).

12. A computer readable medium having stored thereon computer executable components of the system of claim 1.

13. A device employing the system of claim 1 comprising at least one selected from the group consisting of a computer, a server, and a handheld electronic device.

14. A method of predicting values of time observation data in a time series, comprising:
employing a processor executing processor-executable instructions stored on a processor-readable memory to implement one or more acts including:
providing a subset of time observation data that includes observations of at least one entity, the time observation data comprising at least one selected from the group consisting of discrete time observation data and continuous time observation data; and
predicting values of the time observation data utilizing an autoregressive, moving average cross-predictions (ARMAxp) model, the ARMAxp model includes at least one variable that corresponds to the observations associated with at least one entity; and conditional variance of each continuous variable is fixed to a small positive value.

15. The method of claim 14, a distribution of each continuous time tube variable is a decision graph having splits only on discrete variables and having linear regressions with continuous regressors at all leaves, and a distribution of each discrete time tube variable is a decision graph having splits only on discrete variables and having additional distributions at all leaves.

16. The method of claim 15, further including:
employing exact directed acyclic graph (DAG) model inference to predict future observations of the at least one entity.

17. The method of claim 15, further including:
learning parameterization of a structure of the ARMAxp model based on an expectation maximization (EM) algorithm.

18. The method of claim 14, further including:
searching for an appropriate model structure utilizing a search component.

19. The method of claim 18, further including:
improving a model score via the search component.

20. The method of claim 19, further including:
utilizing Bayesian Information Criteria (BIC) for the model score.

21. The method of claim 14, the at least one entity includes a continuous entity varying over time.

22. The method of claim 14, the at least one entity includes a plurality of discrete and continuous entities varying over time.

23. The method of claim 14, the conditional variance of each continuous variable is approximately equal to a value of 0.01.

24. A device employing the method of claim 14 comprising at least one selected from the group consisting of a computer, a server, and a handheld electronic device.

25. A computer readable medium having stored thereon computer executable instructions for performing the method of claim 14.

26. A system for predicting values of time observation data in a time series, comprising:
means for executing computer-executable instructions stored on a computer-readable storage medium, the computer-executable instructions include:
means for predicting values of time observation data that includes observations of at least one entity utilizing an autoregressive, moving average cross-predictions (ARMAxp) model that includes at least one variable that corresponds to the observations associated with the at least one entity; and conditional variance of each continuous time tube variable is fixed to a small positive value.

27. The system of claim 26, the time observation data comprising at least one selected from the group consisting of discrete time observation data and continuous observation data.

28. The system of claim 26, further comprising:
means for searching and scoring a model structure.

29. The system of claim 28, the means for searching and scoring including a means for improving a model score.

30. The system of claim 29, the means for improving a model score utilizing Bayesian Information Criteria (BIC) to score the model.

* * * * *